(12) United States Patent
Bryskin (10) Patent No.: US 9,231,877 B2
(45) Date of Patent: Jan. 5, 2016

(54) METHOD AND APPARATUS FOR SCALING TRAFFIC ENGINEERING ROUTING IN A NETWORK

(71) Applicant: ADVA Optical Networking SE, Meiningen (DE)

(72) Inventor: Igor Bryskin, Great Falls, VA (US)

(73) Assignee: ADVA Optical Networking SE, Meiningen (DE)

( * ) Notice: Subject to any disclaimer, the term of this patent is extended or adjusted under 35 U.S.C. 154(b) by 162 days.

(21) Appl. No.: 14/029,110

(22) Filed: Sep. 17, 2013

(65) Prior Publication Data

US 2015/0078163 A1    Mar. 19, 2015

(51) Int. Cl.
*H04L 12/26* (2006.01)
*H04L 12/815* (2013.01)
*H04Q 11/00* (2006.01)
*H04L 12/721* (2013.01)
*H04L 12/715* (2013.01)

(52) U.S. Cl.
CPC ............... *H04L 47/22* (2013.01); *H04L 45/04* (2013.01); *H04L 45/123* (2013.01); *H04L 45/44* (2013.01); *H04Q 11/0001* (2013.01)

(58) Field of Classification Search
CPC .......... H04L 47/22; H04L 12/26; H04L 12/28
See application file for complete search history.

(56) References Cited

U.S. PATENT DOCUMENTS

| | | | |
|---|---|---|---|
| 7,298,974 B2* | 11/2007 | Tanobe et al. | 398/63 |
| 7,983,239 B1* | 7/2011 | Weinstein et al. | 370/351 |
| 2005/0163101 A1* | 7/2005 | Ashwood Smith et al. | 370/351 |
| 2006/0126502 A1* | 6/2006 | Vasseur et al. | 370/221 |
| 2007/0156670 A1* | 7/2007 | Lim | 707/4 |
| 2011/0019674 A1* | 1/2011 | Iovanna et al. | 370/392 |
| 2012/0106948 A1* | 5/2012 | Moynihan et al. | 398/10 |
| 2012/0243443 A1 | 9/2012 | Li et al. | |
| 2013/0308462 A1* | 11/2013 | Ashida et al. | 370/235 |

OTHER PUBLICATIONS

Extended European Search Report for European Patent Application No. 14168209.6-1857, dated Feb. 24, 2015, 5 pages.
2 pages, dated Aug. 2006.
Paolucci, Francesco et al.; "Delay-Bandwidth-Aware Metric Abstraction Schemes for OIF E-NNI Multidomain Traffic Engineering"; J. Opt. Commun. Netw./vol. 2, No. 10/Oct. 2010, XP-002612904; 12 pages.

* cited by examiner

*Primary Examiner* — Chandrahas Patel
*Assistant Examiner* — Lan Huong Truong
(74) *Attorney, Agent, or Firm* — Westman, Champlin & Koehler, P.A.

(57) ABSTRACT

A method for scaling traffic engineering, TE, routing in a network, having a plurality of network elements (nodes) connected in a given layer to each other via links TE domain segments of a TE domain of said network are collapsed into a virtual TE nodes (VNs). Each VN having an allocated DE domain unique identifier and a detailed connectivity matrix, DCM, to provide a hierarchically virtualized network topology of the network.

13 Claims, 10 Drawing Sheets

METHOD AND APPARATUS FOR SCALING TRAFFIC ENGINEERING ROUTING IN A NETWORK

TECHNICAL BACKGROUND

The invention relates to a method and apparatus for scaling traffic engineering, TE, routing in a network, and in particular to a method and apparatus to scale traffic engineering of large networks using a traffic engineering, TE, hierarchical virtualization technique.

Traffic engineering, TE, on a contemporary transport network such as a wavelength division multiplexing, WDM, layer network does present several challenges. One of these challenges is the sheer amount of information data concerning network elements such as WDM reconfigurable optical add drop multiplexers, ROADM, and links interconnecting these network elements, wherein the information data has to be constantly rediscovered and redistributed to network traffic engineering applications in real time. A further challenge is potentially very big size of traffic engineering databases, TED, and therefore high memory and computation power requirements, especially when considering the complexity of employed path computation algorithms such as optical impairment aware path computations performed in WDM layer networks. What makes it even more difficult to meet these challenges is the fact that service paths in the network have often to be computed in real time, especially in the context of specific applications such as network failure service recovery application. With the increasing size of the network these challenges can become exponentially more difficult to address, so that scalable traffic engineering solutions that work with equal success on networks of different sizes become important.

A general principle of achieving a scalable routing solution is to make sure that there is no entity in the network that knows everything about every network element and link, instead, to orchestrate things in such a way that each entity responsible for route calculations gets an access to detailed information on some network elements and links, while summarized or aggregated information on the rest of the network elements and links is provided. The challenge is to define this aggregated information to be, on the one hand, a significantly smaller in size version of the detailed information, while, on the other hand, to be sufficient for each route computing entity to be able to calculate a route to each of possible network destinations. In other words, the challenge is to come up with the right level of abstraction when performing a summarization of routing information data to provide the shortest possible aggregate without losing any information that might be important for the route calculations.

Figure 1:
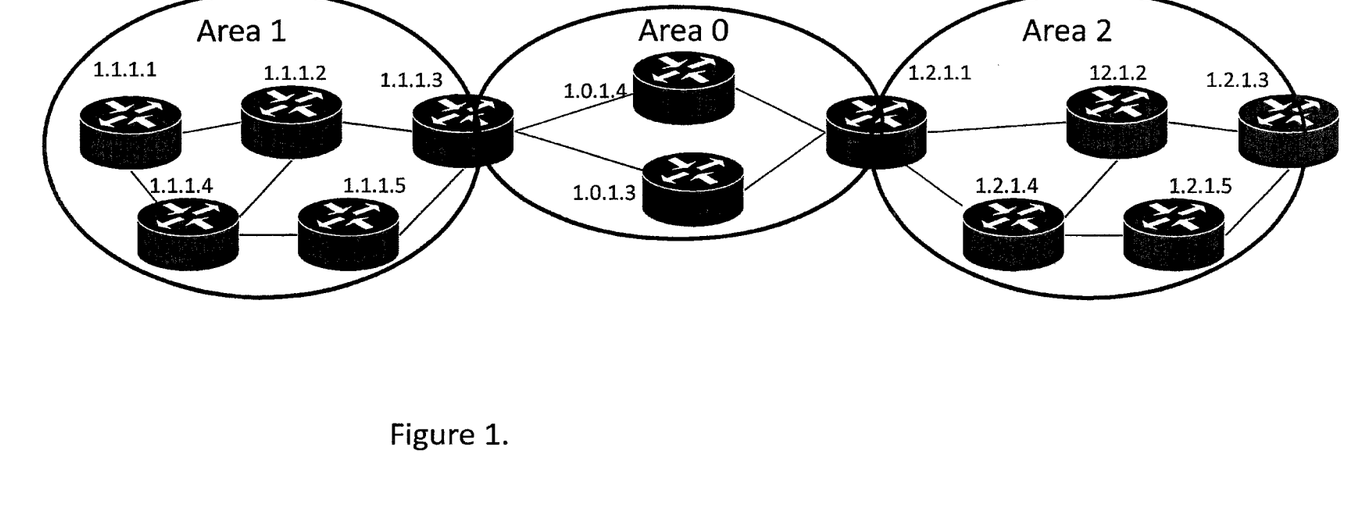
FIG. 1 shows an exemplary conventional multi-area IP network for illustrating a problem underlying the present invention.

For example, in IP intra-domain routing protocols, IGP, such as OSPF or ISIS, this is achieved by breaking the network in multiple areas and by flooding full router and link state advertisements only within the respective local areas of the network, while summarizing on the area borders the intra-area information in the form of IP prefix aggregates that describe the reachability within the areas, and flood the aggregates across the area borders into neighbouring areas. A final result is that any given OSPF or ISIS speaker can calculate a route to any IP destination located in its local areas, as well as to any IP destination located in remote areas. For example, a conventional multi-area IP network configuration is illustrated in FIG. 1. In this example, a node (network element) 1.1.1.1 has full/detailed information about all nodes and links of area 1 illustrated in FIG. 1. At the same time, this node 1.1.1.1 has information about area 2 in the form of a small amount of IP prefixes describing IP reachability within area 2. The IP prefixes are generated by area border node 1.2.1.1 as shown in FIG. 1 and flooded into area 1 via area 0 with the help of area border node 1.1.1.3. This makes it possible for node 1.1.1.1 to calculate IP routes not only to nodes within area 1 such as to node 1.1.1.5 but also to nodes in the remote area 2, for example, to node 1.2.1.2. This is achieved on the reduced network topology information, which is smaller in size and better manageable compared to one of a flat single-area configuration of the same physical network.

Figure 2:
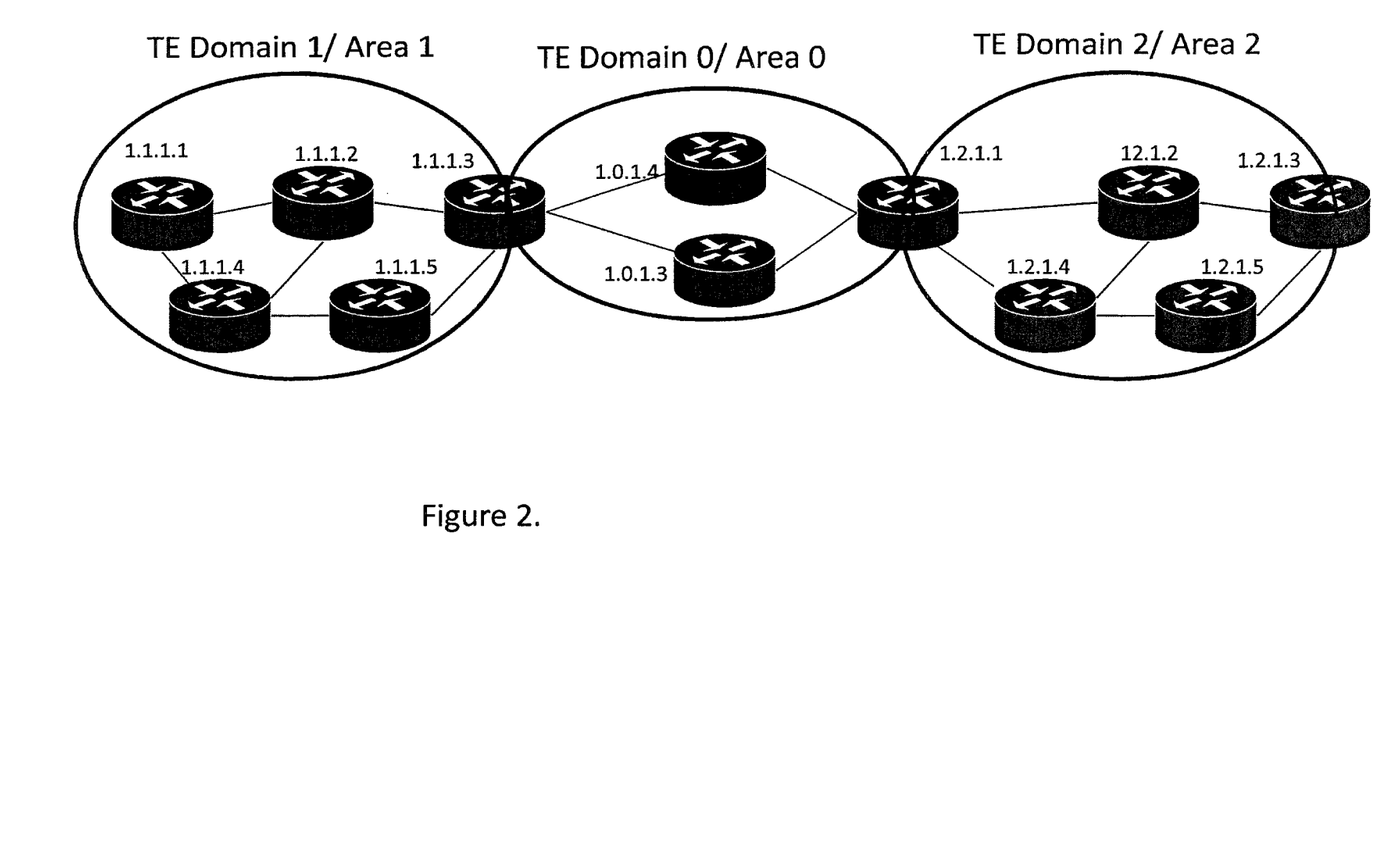
FIG. 2 illustrates a distributed TE path computation performed in the multi-domain network shown in FIG. 1 to illustrate a problem underlying the present invention.

The most popular conventional way to scale the TE routing is to break the network into multiple TE domains and to map each of said domains onto a separate IGP (OSPF or ISIS) area as illustrated in FIG. 2. Because IGP uses the same mechanism to flood both IP routing and TE information, this approach limits the scope of TE information dissemination in the network and hence the traffic engineering database, TED, size on a given IGP speaker, such as node 1.1.1.1 to local to the node areas. The problem with TE routing is the difficulty of TE information aggregation for the following reasons. In contrast to IP routing, which deals only with IP reachability and is concerned only with IP addresses designed specifically to be aggregatable, traffic engineering, TE, routing, which is the process of computing of traffic engineering paths, deals with a much richer set of information about nodes and links within the network. This data is very difficult to summarize without losing details important for the traffic engineering, TE, path calculation. Therefore, inter-domain traffic engineering, TE, paths are commonly computed with no TE visibility into the remote TE domains.

One conventional way of doing so is by using a distributed path computation technique. Specifically, if node 1.1.1.1 located in TE domain 1, as illustrated in FIG. 2, which is to set up a service to node 1.2.1.2 TE domain 2, node 1.1.1.1 can compute a TE path to a border node 1.1.1.3 located on the border between TE domain 1 and TE domain 0, being the next TE domain towards the destination. Then, the node 1.1.1.1 can signal a service setup message along the computed path. When node 1.1.1.3, being the border node, receives the service setup message, it repeats the steps taken on node 1.1.1.1 and computes a path to the border node of the next TE domain towards the destination node, i.e. node 1.2.1.1 and signals the service setup message along the path, and so forth, until the path is computed to the service destination (by node 1.2.1.1). This conventional approach is rather simple, but has some severe deficiencies. On such deficiency is the necessity to know in advance the sequence of TE domains for the resulting path to be traversed. A further deficiency is a potential failure or sub-optimality of the distributed path computation. For example, a path segment chosen for TE domain N may yield no path segment across TE domain N+1 (which may exist should a different path segment across TE domain N has been selected). Yet another deficiency of this conventional approach is the complexity of computation of diverse end-to-end paths for the same service, and even more so, when computing concurrently paths for multiple services with distinct source/destination service termination points.

Figure 3:
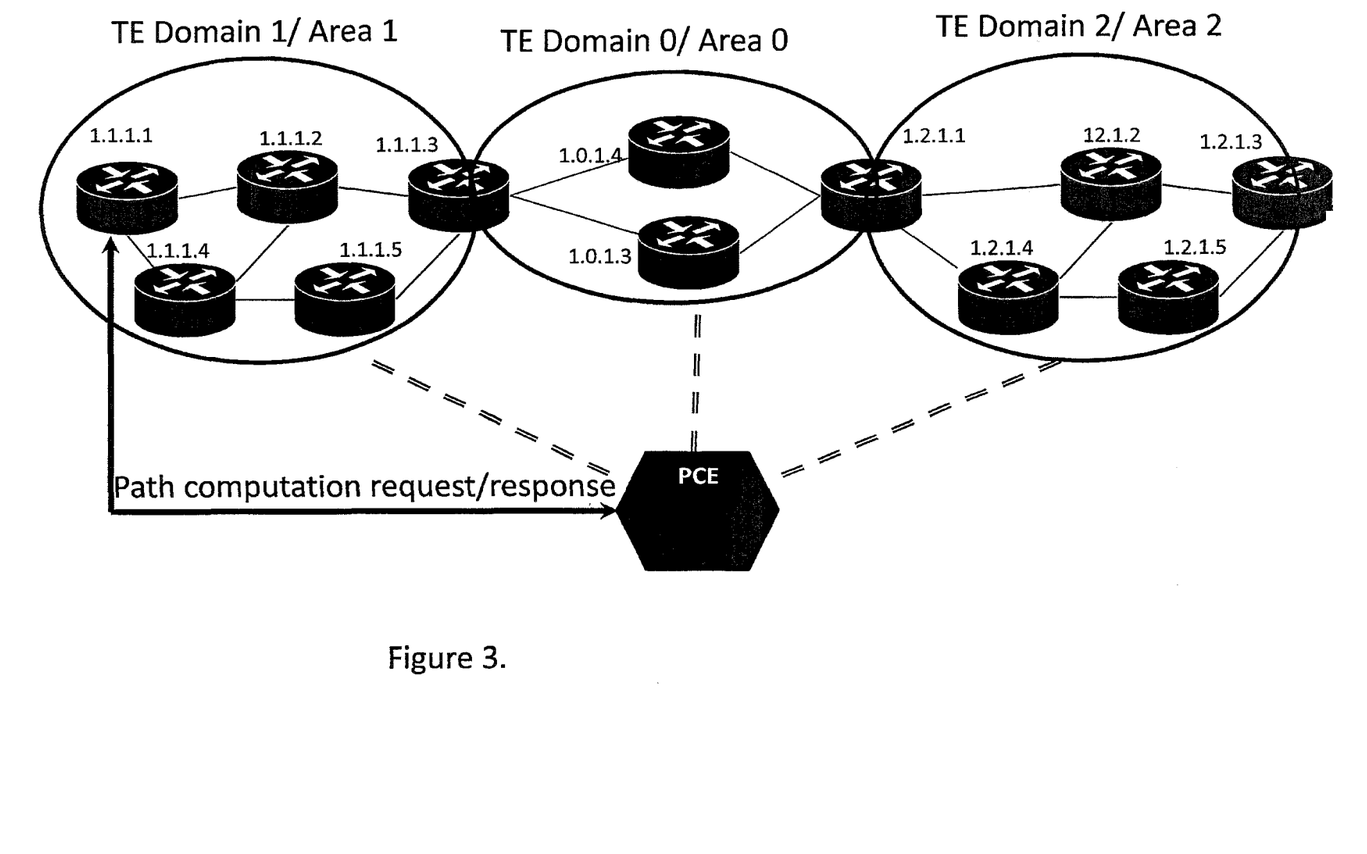
FIG. 3 illustrates a conventional traffic engineering, TE, computation in a multi-domain network with a single path computation element, PCE, to illustrate a problem underlying the present invention.

Another widely used conventional method to compute inter-domain TE paths under conditions of limited or no TE visibility is by using remote path computation elements, PCE, in accordance with the PCE-based architecture (RFC4655). Specifically, if a given node of the network such as node 1.1.1.1, as illustrated in FIG. 3, cannot compute path(s) to a destination located in one of the non-local TE domains because of lack of TE visibility (for example, to node 1.2.1.2), the path computation can be requested from one or more of the path computation elements, PCEs, of the network that supposedly have a better view of the TE domains across which the resulting path(s) will traverse. This conventional approach works exceptionally well when the paths are computed by a path computation element, PCE, that has full visibility in each of the network's TE domains, as shown in FIG. 3. However, in this case it is assumes that a single entity, i.e. the path computation element, PCE, knows all details about every network element and link of the network, which means a violation of the above-mentioned principle of network scalability. Consequently, this sets a limit to the extent the approach can scale. In other words, providing a given path computation element, PCE, with detailed traffic engineering, TE, information on each and every network TE domain does not solve the scalability problem, rather, pushes the problem from the network element to the path computation element, PCE.

Figure 4:
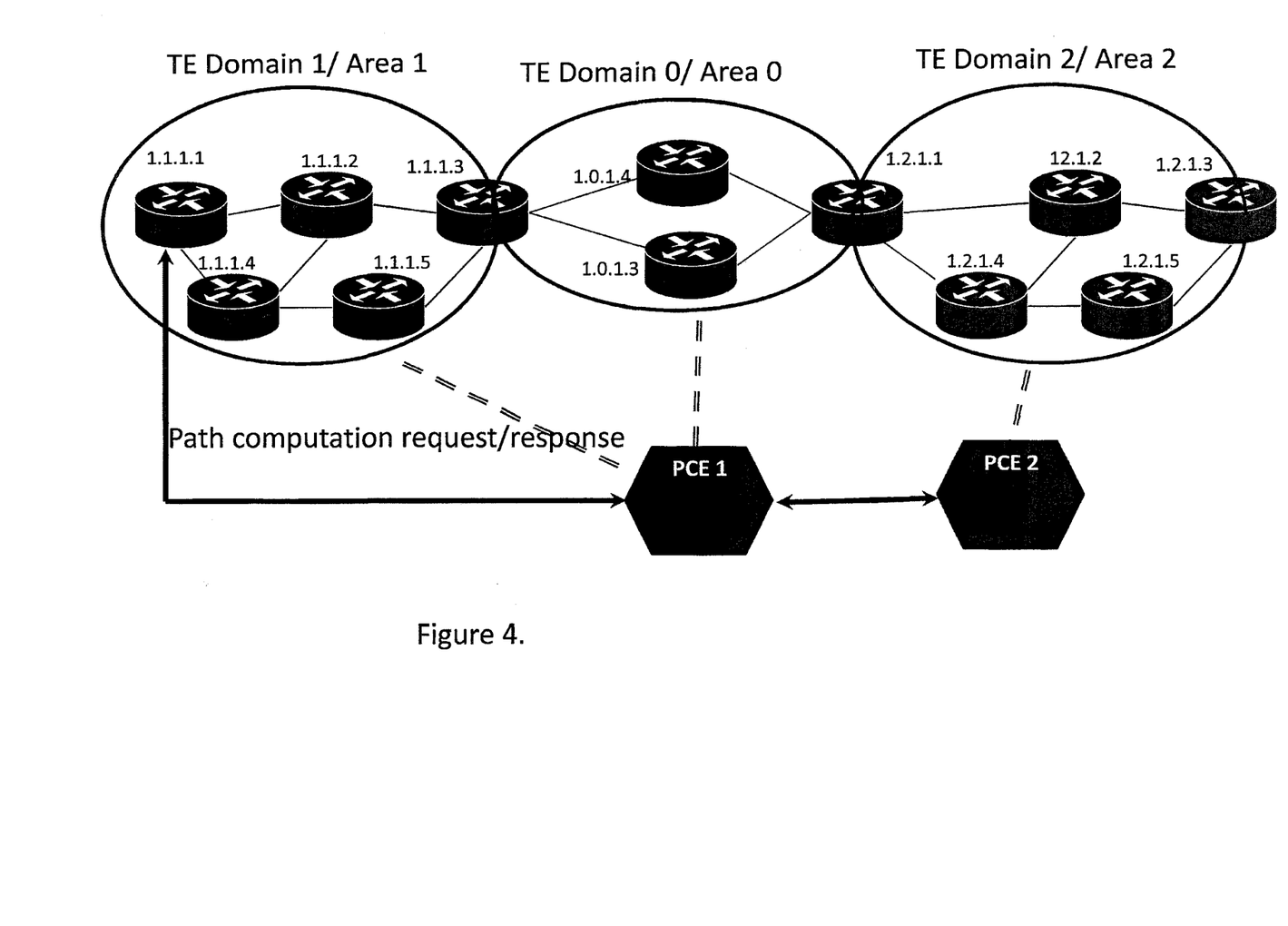
FIG. 4 shows an example for multi-domain traffic engineering, TE, path computation with two path computation elements to illustrate a problem underlying the present invention.
Figure 5:
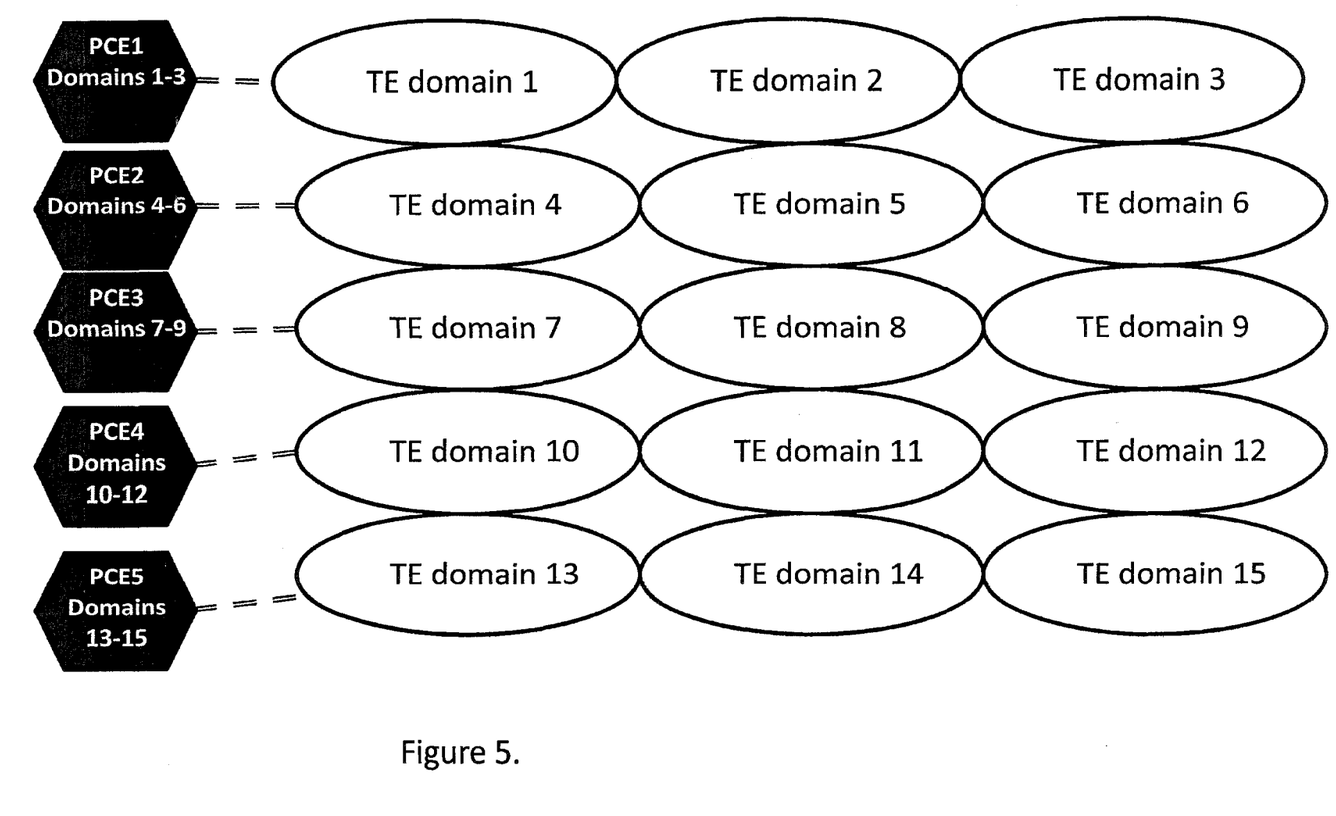
FIG. 5 shows a diagram of a network comprising a plurality of domains to illustrate a problem underlying the present invention.

It is also possible according to the path computation element, PCE-based network architecture to have several network path computation elements, PCEs, wherein each of them covers a sub-set but not all of the TE domains. Covering means in this context that a given path computation element, PCE, has detailed up-to-date information on a sub-set of TE domains. Consequently, it is possible to orchestrate the cooperation of the path computation elements, PCEs, to satisfy a given inter-domain path computation request as illustrated in FIG. 4. However, organizing such an orchestration, compared with the path computation in a single TE domain, is, generally speaking, extremely complex, cumbersome and computation timewise unpredictable to a point where it becomes totally impractical. To illustrate this, one can consider the example illustrated in FIG. 5, wherein a network is broken into 15 TE domains and wherein the network has 5 path computation elements, PCEs, each of which covering its own set of 3 domains. Suppose, the path computation elements, PCEs, are presented with a request to compute a path between destinations located, for example, in TE domains 1 and 13, respectively, which can potentially cross any of the domains. One can consider in this example the contribution of, for example, path computation element PCE3 to the path computation process. Because PCE3 does not have end-to-end TE visibility for the potential resulting path, it has no choice but to compute a full set of paths from all potential entry points into its TE visibility area (which are domains 7, 8 and 9) to all potential exit points from the area and to convey the entire path set to the next path computation element PCE, e.g. PCE4, which would augment/multiply the path set. These steps will be repeated on each of the path computation elements PCEs, until the request with the accumulated path set reaches the path computation element PCE5, covering local to the path destination TE domain, where the most optimal path from the set can be selected. The PCE orchestration described above becomes more complex with the increasing number of TE domains and inter-connections between them. The approach gets drastically more complex when it is required to compute more than one diverse path between a source and a destination, and the problem gets practically impossible to solve, when it is required to computer concurrently multiple paths for multiple services depending on a global optimization criterion.

In addition to the deficiencies described above, all conventional approaches based on mapping TE domains on IGP areas have the following drawbacks. They are based on the assumption that a universal TE address space across all domains does exist. This means that when adding new segments to the network, an operator has to coordinate the address assignment with all existing TE domains to avoid any address conflicts. This is very inconvenient and causes more configuration errors with the increasing size of the network. Further, the conventional approaches work under the assumption that all currently unreserved/uncommitted network resources of the network are equally available for all potential clients and services. It is impossible, for example, to ear-mark a set of resources to be available only for internal network building purposes, but not for the services provided for network clients.

Accordingly, there is a need to provide a method and apparatus for scaling traffic engineering, TE, routing in a network which, on the one hand, overcomes the above-mentioned drawbacks and deficiencies and, on the other hand, provides a scalable traffic engineering solution that works equally well on networks of any size.

SUMMARY OF THE INVENTION

The invention provides according to a first aspect a method for scaling traffic engineering, TE, routing in a network, comprising a plurality of network elements (nodes) connected in a given layer to each other via links,
wherein TE domain segments of a TE domain of said network are collapsed into virtual TE nodes, VNs, each having an allocated TE domain unique identifier and a detailed connectivity matrix, DCM, to provide a hierarchically virtualized network topology of the network.

According to a possible embodiment of the method according to the first aspect of the present invention, a TE domain segment is selected by a network operator as an arbitrary part of the TE domain and is collapsed into at least one virtual TE node, VN, representing the selected TE domain segment.

According to a further possible embodiment of the method according to the present invention, the virtual TE node collapsing is achieved by reconfiguring the TE links connecting the selected TE domain segment with the rest of the TE domain as well as all of the TE domain segment internal TE links, ILs, in such a way that the modified TE access link, AL, advertisements, being flooded across the TE domain, represent said TE domain segment to the remaining part of the TE domain as at least one virtual TE node, while the modified internal TE link, IL, advertisements are contained within respective virtual TE nodes, VNs, and are not leaked into said TE domain.

According to a further embodiment of the method according to the first aspect of the present invention, the internal TE links, ILs, connecting TE nodes within the selected TE domain segment represented by at least one virtual TE node, VN, are reconfigured to be advertised into and contained within distinct TE domain(s), each of which is associated with the respective virtual TE node, VN.

According to a further possible embodiment of the method according to the first aspect of the present invention, a dedicated policy controller of a virtual TE node, VN, is provided to enforce policies of the network operator with respect to a required connectivity between the access TE links, ALs, across the virtual TE node, VN.

According to a further possible embodiment of the method according to the first aspect of the present invention, a dedicated path computation element, PCE, of the virtual TE node, VN, performs internal path computations between access TE links, ALs, of said virtual TE node, VN, to generate the detailed connectivity matrix, DCM, of the virtual TE node, VN, advertised to the TE domain external to the virtual TE node, VN.

In a further possible embodiment of the method according to the first aspect of the present invention, the selected TE domain segment comprises TE nodes including virtual TE nodes, VNs, connected to each other via TE links including virtual TE links, VLs.

In a further possible embodiment of the method according to the first aspect of the present invention, a hierarchically virtualized network topology of the network comprising virtual TE nodes, VNs, of different hierarchy levels is exploited to compute a path between a source TE node and a destination TE node on said hierarchically virtualized network topology.

The invention further provides according to a second aspect an apparatus for scaling traffic engineering, TE, routing in a network comprising a plurality of network elements (nodes) connected in a given network layer to each other via links being adapted to collapse selected by the operator arbitrary TE domain segments of a TE domain of said network into virtual TE nodes, VNs, each having a located TE domain unique identifier, VNID, and a detailed connectivity matrix, DCM, to provide a hierarchically virtualized network topology of said network.

According to a possible embodiment of the apparatus according to the second aspect of the present invention, a TE domain segment is selected by a network operator and collapsed into at least one virtual TE node, VN, representing the selected TE domain by reconfiguring access TE links, ALs, connecting the selected TE domain segment with the remaining external TE domain such that they advertise the TE domain unique identifiers, VNIDs, of the respective virtual TE nodes, VNs, as local TE node identifiers.

According to a further possible embodiment of the apparatus according to the second aspect of the present invention, the internal TE links, ILs, connecting TE nodes within the selected TE domain segment represented by at least one virtual TE node, VN, are reconfigured to be advertised into distinct TE domains, each associated with a respective virtual TE node, VN.

According to a further possible embodiment of the apparatus according to the second aspect of the present invention, a dedicated policy controller of a virtual TE node, VN, is provided to enforce policies of the network operator with respect to a required connectivity between the access TE links, ALs, across the virtual TE node, VN.

In a further possible embodiment of the apparatus according to the second aspect of the present invention, a dedicated path computation element, PCE, of a virtual TE node, VN, performs internal path computations between access TE links, ALs, of said virtual TE node, VN, to generate the detailed connectivity matrix, DCM, of the virtual TE node, VN, advertised to the TE domain external to the virtual TE node, VN.

The invention further provides according to a third aspect a transport network comprising at least one apparatus according to the second aspect of the present invention.

According to a possible embodiment of the transport network according to the third aspect of the present invention, the transport network comprises a wavelength division multiplexing, WDM, layer network According to a further possible embodiment of the transport network according to the third aspect of the present invention, the transport network comprises a SDH network.

According to a further possible embodiment of the transport network according to the third aspect of the present invention, the transport network comprises an Ethernet network.

In a still further possible embodiment of the transport network according to the third aspect of the present invention, the transport network comprises a MPLS-TP network.

BRIEF DESCRIPTION OF THE FIGURES

In the following, possible embodiments of the different aspects of the present invention are described with reference to the enclosed figures.

DETAILED DESCRIPTION OF POSSIBLE EMBODIMENTS

Figure 6:
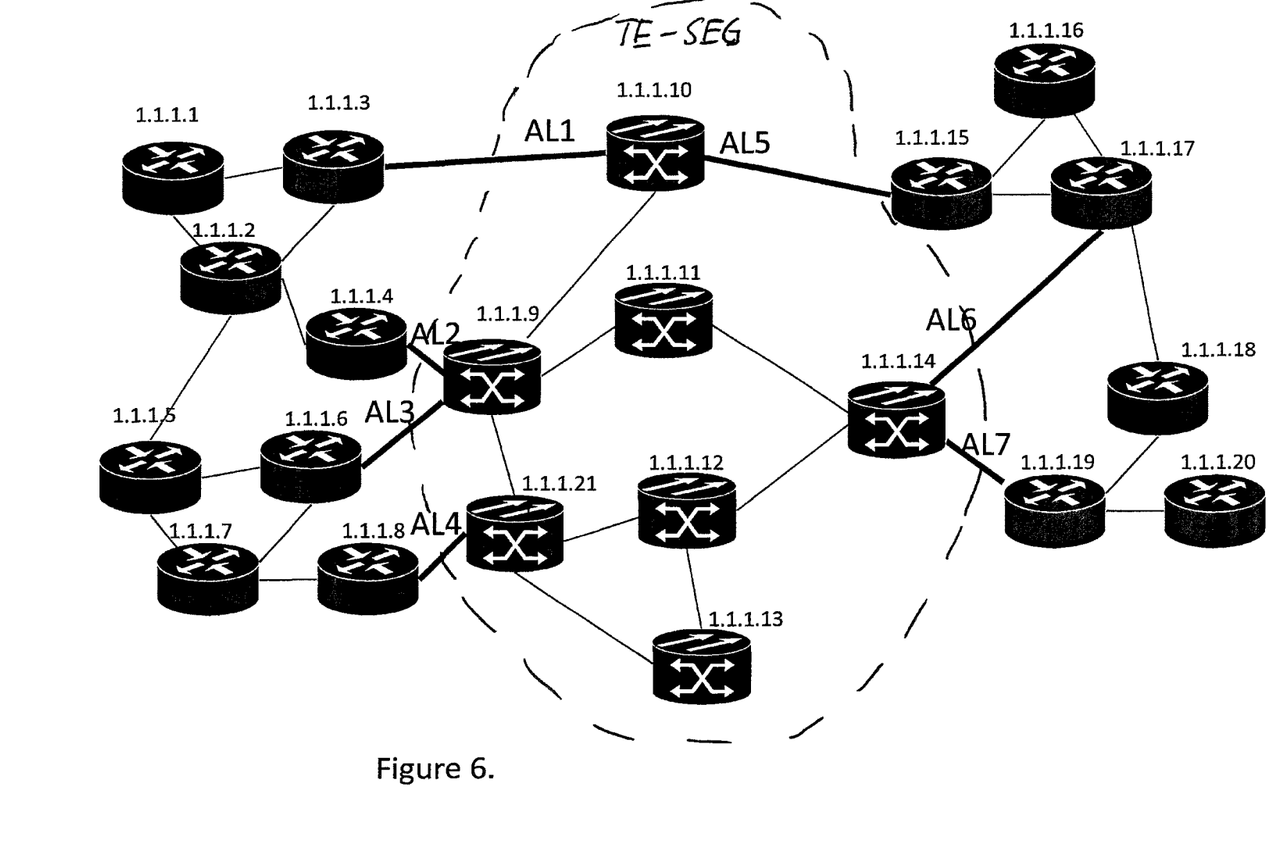
FIG. 6 shows a diagram of an exemplary network to illustrate a step according to a possible embodiment of the method for scaling traffic engineering routing in the network according to the present invention.

The present invention relates to a method for scaling traffic engineering, TE, routing in a network. This network comprises a plurality of network elements (nodes) connected in a given layer of said network to each other via links. An exemplary network comprising a plurality of nodes connected in a layer to each other via links is illustrated in FIG. 6. The network shown in FIG. 6 can be a transport network connecting the nodes via links. The transport network can be in a possible embodiment a wavelength division multiplexing, WDM, layer network. Further, the transport network can also be a SDH network, an Ethernet network and/or a MPLS-TP network. With the method according to the first aspect of the present invention, the traffic engineering, TE, domain segments of a traffic engineering domain of the network are collapsed into virtual TE nodes, VNs. Each virtual TE node, VN, has an allocated traffic engineering, TE, domain unique identifier, VNID, and a detailed connectivity matrix, DCM, to provide a hierarchically virtualized network topology of the respective network. The method according to the present invention provides a traffic engineering hierarchical virtualization mechanism which comprises as a possible operation collapsing of a TE domain segment of a given TE domain into at least one virtual TE node, VN. The collapsing to the virtual TE node includes TE link reconfigurations which can be performed by a network operator. Accordingly, as illustrated in FIG. 6, a contiguous segment of a TE domain can be represented in the TE domain as a single virtual TE node. FIG. 6 shows a TE domain segment, TE-SEG, comprising several TE nodes of the network. The selected traffic engineering domain segment, TE-SEG, comprises in the shown example seven TE nodes 1.1.1.9, 1.1.1.10, 1.1.1.11, 1.1.1.12, 1.1.1.13, 1.1.1.14 and 1.1.1.21. The TE domain segment, TE-SEG, is selected in a possible embodiment by a network operator of the network as an arbitrary part of the TE domain. The TE domain segment, TE-SEG, can be collapsed into at least one virtual TE node, VN, representing the TE domain segment, TE-SEG, within said TE domain as one or more independent and/or interconnected virtual TE nodes, VNs. The collapsing to the virtual TE node, VN, is achieved in a possible embodiment by reconfiguring the access TE links, ALs, connecting the selected TE domain segment, TE-SEG, with the rest of the TE domain as illustrated in FIG. 6. In the example, the traffic engineering segment, TE-SEG, is connected via access TE links AL1 to AL7 to the rest of the TE domain. For example, TE node 1.1.1.9 of the selected TE domain segment is connected via an access TE link AL2 to TE node 1.1.1.4 (which does not belong to the TE domain segment, TE-SEG, rather, is a part of the external TE domain) and via access TE link AL3 to TE node 1.1.1.6. Further, the collapsing to the virtual TE node, VN, is achieved by reconfiguring all of the TE domain segment internal TE links, ILs The result of said re-configuration is that modified access TE link, AL, advertisements, being flooded across the TE domain external to the collapsed TE domain segment, TE-SEG, represent the segment to the remaining part of the TE domain as at least one virtual TE node, VN, while the modified internal TE link, IL, advertisements are contained within respective virtual TE nodes, VNs, and are not leaked into the external part of the TE domain. With the method according to the present invention, for the virtual TE node, VN, a TE domain unique identifier, VNID, is allocated. The access TE links, ALs, connecting the selected TE segment, TE-SEG, to the rest of the TE domain, i.e. the virtual TE node access links AL1 to AL7 shown in the example of the FIG. 6 can be reconfigured so that they do advertise the allocated TE domain unique identifier, VNID, as a local TE node ID. Further, the TE links internal to each virtual node, ILs, are reconfigured to be advertised into a separate TE domain (one for each VN) being distinct from each other and from the TE domain in question (i.e. external TE domain). This can be achieved in a possible embodiment via assigning a new instance of an IGP-TE protocol to be used for the internal TE link, IL, advertisement dissemination or, alternatively, to configure for the internal TE links, ILs, a new area ID being distinct from the one assigned to the access TE links, ALs. The result of above mention internal TE link, IL, re-configuration is that the ILs, connecting TE nodes within the collapsed TE domain segment, TE-SEGwill be advertised into distinct TE domains, each of which being associated with the respective virtual TE node, VN.

In a possible embodiment, a dedicated policy controller of a virtual TE node, VN, is provided to enforce policies of the network operator with respect to a required connectivity between the access TE links, ALs, across the virtual TE node, VN. Examples for such policies are: what access TE links, ALs, are to be connected (for example, access TE link AL1 could be required to be interconnected with AL2, AL3 and AL5 but not with AL4, AL6 and AL7), how diverse the internal paths need to be from each other, what is the internal path computation optimization criterion, etc. In a possible embodiment, the path computation element, PCE, is provided to perform the virtual TE node internal path computations, i.e. the determining paths between the access TE links, ALs, of the virtual TE node, VN, based on the VN's internal traffic engineering database, TED, and to generate the detailed connectivity matrix, DCM, of the virtual TE node, VN, to be advertised into the external TE domain.

Figure 7:
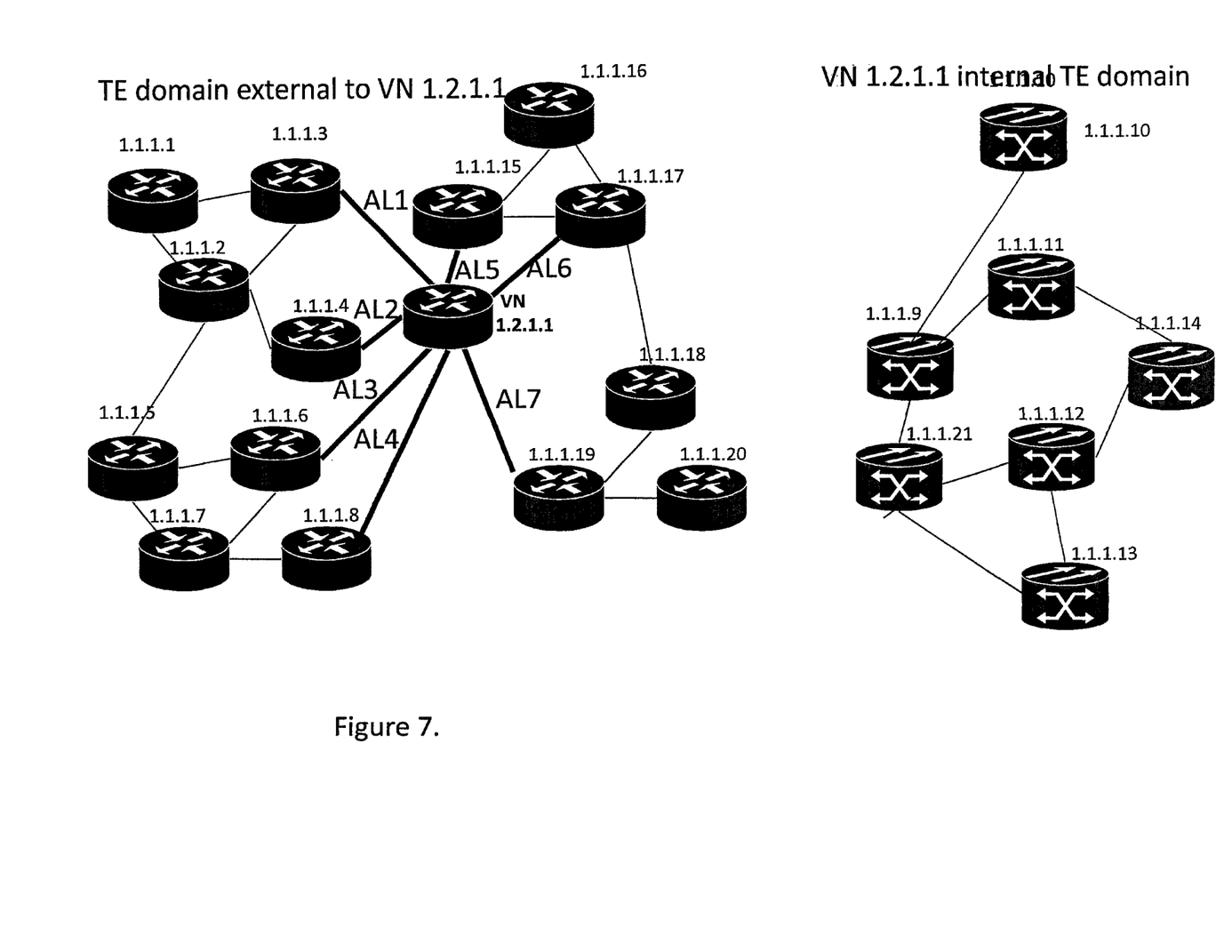
FIG. 7 shows a further diagram for illustrating a further step of a possible embodiment of a method for scaling traffic engineering routing in the network shown in FIG. 6.

In the given example, the end result of the collapsing of the selected TE domain segment, TE-SEG, into the virtual TE node, VN, is illustrated in FIG. 7. As can be seen, internal TE links, ILs, and internal TE node advertisements of the virtual node, VN, are withdrawn from the external traffic engineering, TE, domain, as illustrated in FIG. 7 on the left and moved into the internal TE domain illustrated in FIG. 7 on the right. As can be seen in FIG. 7, the internal topology of the virtual TE node is presented in the external TE domain as a single, generally speaking, asymmetrical virtual TE node VN 1.2.1.1 (shown in the middle of the topology) advertising a detailed connectivity matrix, DCM.

Such an asymmetrical virtual TE node can be considered as an asymmetrical switch. Switching on an asymmetrical switch can exhibit different effects on cost and quality of the service data transfer depending on which pair of access TE links, ALs, is selected for the service in question. A detailed connectivity matrix, DCM, of the virtual TE node, VN, comprises in a possible implementation for each allowed switching combination of access TE links, ALs, of this virtual TE node, VN, at least one detailed connectivity matrixentry, DCME. This detailed connectivity matrix entry, DCME, can represent a potential connection internal to said virtual TE node interconnecting the access TE link, AL, pair of said virtual TE node, VN. In a further possible embodiment, a detailed connectivity matrix entry, DCME, advertisement can comprise a detailed connectivity matrix entrycost vector, DCME CV, which can comprise a set of attributes describing cost penalties in terms of various service characteristics that a service will incur if it selects the internal path across the virtual TE node, VN, in accordance with the detailed connectivity matrix entry, DCME in question. In a possible implementation, the cost attributes of the detailed connectivity matrix entry cost vector, DCME CV, can comprise, for instance, a data propagation delay penalty, a data loss ratio penalty, a traffic engineering, TE, cost penalty, an optical signal quality penalty and/or a network failure fate-sharing penalty. In a possible implementation, the detailed connectivity matrix, DCM, may be advertised by the virtual TE node, VN, to the traffic engineering, TE, domain and thus being made available to a network path computer adapted to calculate optimal service paths traversing the virtual TE node, VN, taking into account cost penalties advertised by the virtual TE node, VN, for one or more detailed connectivity matrix entries, DCMEs, in the form of detailed connectivity matrix entry cost vectors, DCMECVs. In a possible implementation, the detailed connectivity matrix, DCM, can be advertised by the virtual TE node, VN, into the traffic engineering, TE, domain using an OSPF-TE or an ISIS-TE protocol.

FIG. 7 shows in the exemplary network the TE domain topology after collapsing of one of the TE domain segments, TE-SEG, displayed in FIG. 6 to the virtual TE node, VN, 1.2.1.1. After the collapsing, the external TE domain does not see the internals of the virtual TE node, VN, i.e. it does see the entire internal TE domain of said virtual TE node, VN, as a single TE node. At the same time, the TE nodes internal to the virtual TE node, VN, are only aware of other internal TE nodes and internal TE links interconnecting them, and have no information about the external TE domain illustrated in FIG. 7 on the left. For example, each TE node illustrated in FIG. 7 on the right side does have detailed information on every other TE node within the internal TE domain, but does not have any information about any TE node or link of the external TE domain illustrated in FIG. 7 on the left. Consequently, the original flat view of the TE domain after collapsing of the TE domain segment, TE-SEG, into virtual TE node, VN, is split into two smaller and better manageable TE views illustrated in FIG. 7 with providing sufficient information to perform path computations in either of the TE domains. The external TE domain illustrated in FIG. 7 on the left side can be (in its entirety or any part of it be collapsed into a virtual TE node, VN, as well and can be presented as a single TE node into the same TE domain or a TE domain of a higher level. This is, for instance, shown in FIG. 10. As can be seen, the virtual TE node, VN, 1.2.1.1 is nested within the virtual TE node, VN, 1.3.1.1 shown on the left side of FIG. 10. Therefore, the collapsing of a TE domain segment, VT_SEG, into virtual RE node, VN, is a hierarchical in nature procedure, and there are no limitations to the depth of virtual TE node nesting within each other.

Figure 8:
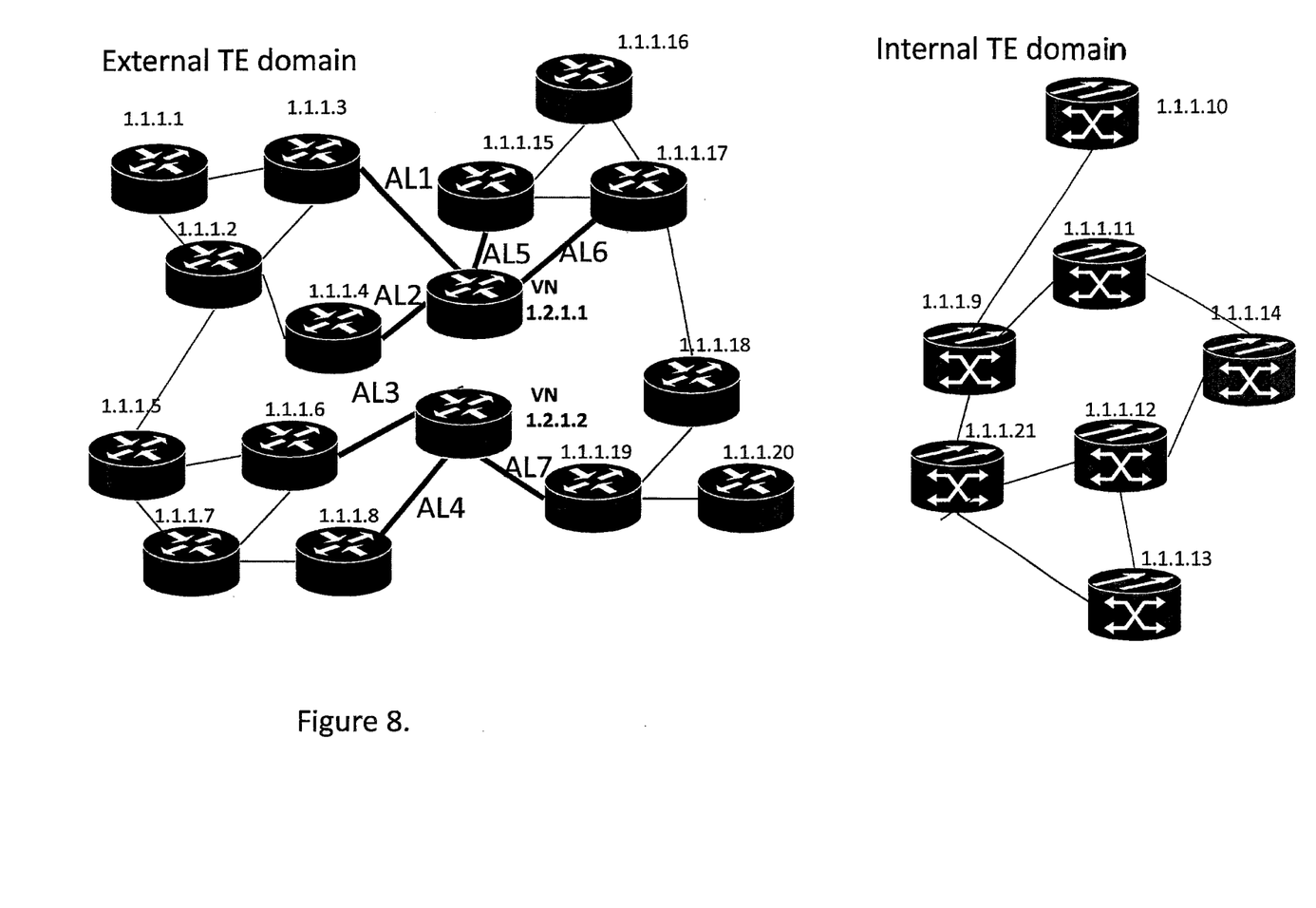
FIG. 8 shows a collapsing into two different unconnected virtual nodes as performed by a possible embodiment of the method according to the present invention.
Figure 9:
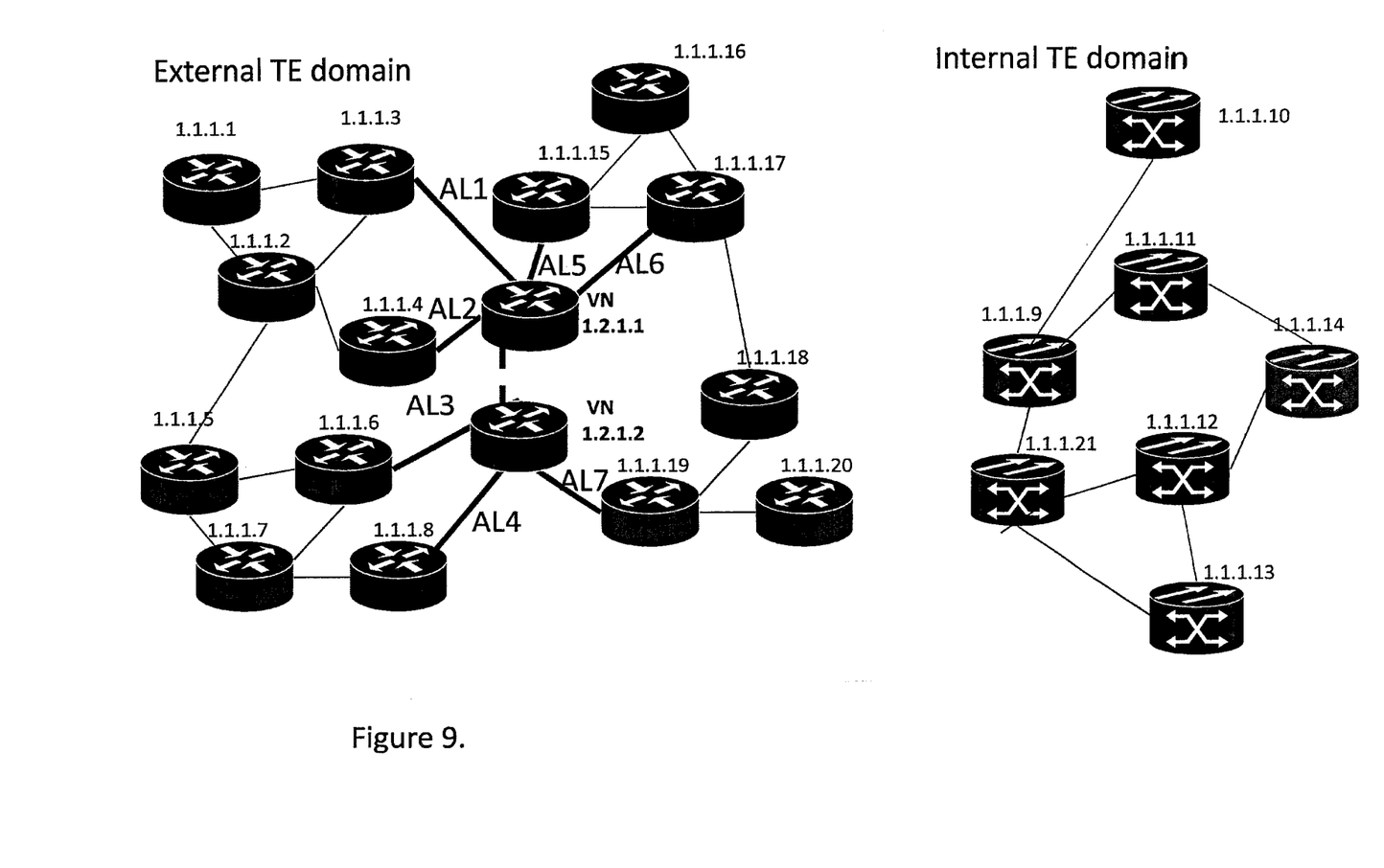
FIG. 9 shows a diagram for illustrating collapsing into a virtual topology as performed by a possible embodiment of the method according to the present invention.

Furthermore, the TE domain segments, TE_SEGs, presented as separate virtual TE nodes, VNs, in the same TE domain may overlap partially or in their entirety. In particular, the same TE domain segment, TE-SEG, that could be represented as a single heavily asymmetrical virtual TE node with a large detailed connectivity matrix, DCM, can in many cases instead be represented as two or more separate symmetrical or mildly asymmetrical virtual TE nodes, VNs. Accordingly, in the exemplary network as illustrated in FIG. 6, the same TE domain segment, TE-SEG, can be collapsed into a single virtual TE node VN 1.2.1.1 with seven access TE links AL1 to AL7, as illustrated in FIG. 7 or, alternatively, into two separate virtual TE nodes, VN 1.2.1.1 and VN 1.2.1.2, as illustrated in FIG. 8. Each of the two virtual TE nodes, VNs, can have its own set of access TE links, ALs. In the example shown in FIG. 8, the first virtual TE node VN 1.2.1.1 comprises access TE links AL1, AL2, AL5, AL6, whereas the second virtual TE node VN 1.2.1.2 comprises three access TE links AL3, AL4, AL7. In the example, illustrated in FIG. 8, the virtual TE node VN 1.2.1.1 and the virtual TE node 1.2.1.2 are not interconnected. It is also possible that the virtual TE nodes, VNs, representing a selected TE domain segment, TE-SEG, are interconnected with each other via virtual TE links, VLs, as illustrated, for instance, in FIG. 9.

In a possible embodiment, the hierarchically virtualized network topology of the network comprising virtual TE nodes, VNs, of different hierarchical levels can be exploited to compute a path between a source TE node and a destination TE node within a given traffic engineering, TE, domain. In a possible embodiment, the traffic engineering hierarchical virtualization, according to a possible embodiment of the present invention, does comprise two operations: collapsing to a virtual node, VN, and expanding of the virtual node, VN. Expanding of the virtual node, VN, is an operation opposite to the collapsing to a virtual node, VN. The expanding operation undoes the reconfigurations of the access TE links, ALs, and internal TE links, ILs, of the respective virtual node, VN, resulting in a leaking of the virtual node internal TE information to the external TE domain, i.e. achieving a precollapse flat view of the TE domain, as illustrated for example in the exemplary network shown in FIG. 6.

According to a further aspect, the present invention can provide in a possible embodiment an apparatus for scaling traffic engineering, TE, routing in a network comprising a plurality of TE nodes connected in a given network layer to each other via TE links as illustrated in the exemplary network of FIG. 6. The apparatus, according to this aspect of the present invention, is adapted to collapse selected by the operator arbitrary TE domain segments, TE-SEGs, of a TE domain of the network into virtual TE nodes, VNs, each having an allocated TE domain unique identifier, VNID, and a detailed connectivity matrix, DCM, to provide a hierarchically virtualized network topology of the respective network.

With the method and apparatus, according to the present invention, a scalable traffic engineering solution is provided which works equally well on networks of any size. With the method and apparatus, according to the present invention, a dissemination of traffic engineering information is compartmentalized within separate traffic engineering domains of relatively small sizes. Furthermore, the traffic engineering information data selected in the same traffic engineering domains can be aggregated, and the aggregated information can be leaked into other traffic engineering domains. In a possible embodiment, the domain actual traffic engineering information, while being significantly compressed, at the same time sufficient data for path computations across the traffic engineering domains with the limited/aggregated traffic engineering view is provided.

This is achieved by collapsing a selected contiguous traffic engineering segment, TE-SEG, into a virtual TE node, VN. Because the traffic engineering advertisements of the TE domain segment, TE-SEG, is moved from one (external) TE domain into another (internal to the VN) TE domain, the operation limits the TE information dissemination scope and splits the corresponding traffic engineering database, TED, into two traffic engineering databases, TEDs, of smaller sizes. The collapsing does not affect the internal to the virtual node, VN, domain path computations, i.e. the internal traffic engineering database, TED, still comprises the detailed TE information on every internal TE node and TE link of the virtual node, VN. Furthermore, sufficient information for path computations is provided to the external to the virtual TE node, VN, TE domain. This is because the TE domain can view the virtual TE node, VN, as an asymmetrical switch with a known detailed connectivity matrix, DCM. In particular, when evaluating paths traversing the virtual TE node, VN, the external TE domain path computer can use the metrics advertised with the respective detailed connectivity matrix entries, DCMEs, and can select most optimal and sufficiently disjoint from each other paths across the virtual TE node, VN, without knowing details of the TE domain segment, TE-SEG, represented by the virtual TE node, VN. The said metrics can comprise, for instance, TE cost, data delay, optical impairments. fate-sharing information data, etc.

With the method and apparatus according to the present invention, the size of the detailed connectivity matrix, DCM, advertised for a given virtual TE node, VN, does not depend on the size of the TE domain segment TE-SEG, represented by the respective virtual TE node, VN. Rather, the size depends on the connectivity requirements across the traffic engineering segment, TE-SEG, and hence the respective virtual TE node, VN, set by the network operator. For example, if it is required to interconnect a set of 4 access TE links, ALs, of a given virtual TE node, VN, the detailed connectivity matrix, DCM, advertised for the virtual TE node, VN, can have up to 6 entries regardless of the size and configuration of the traffic engineering domain segment, TE-SEG, which is represented by the virtual TE node, VN.

There are numerous possible ways for the network operator to manage the actual size and contents of the detailed connectivity matrices, DCMs, advertised for the respective virtual TE nodes, VNs. For example, it is possible that a given TE domain segment, TE-SEG, with a given set of connectivity requirements across the segment requires a large detailed connectivity matrix, DCM, if represented as a single heavily asymmetrical virtual TE node, VN. However, if the access TE links, ALs, of the virtual TE node, VN, can be broken, for example, into two or more sets with unconstrained connectivity between the links within each set and no connectivity between the ALs belonging to different sets, the TE domain segment, TE-SEG, can be represented as two or more independent and unconnected virtual TE nodes, VNs, with each of them advertising its own set of access TE links, ALs, and no detailed connectivity matrix, DCM. It is also possible to substitute an advertisement of a single heavily asymmetrical virtual TE node, VN, with a relatively large detailed connectivity matrix, DCM, with advertisements of several unconnected mildly asymmetrical virtual TE nodes, VNs, each with a relatively small or no detailed connectivity matrix, DCM. As it is shown, for example, in FIG. 8, it can be possible to collapse a TE domain segment, TE-SEG, into two unconnected virtual TE nodes VNs, i.e. virtual TE nodes VN 1.2.1.1 and virtual TE node VN 1.2.1.2, each with a smaller set of access TE links, ALs, and a small or no detailed connectivity matrix, DCM, which is better than collapsing the said TE domain segment, TE-SEG, into a single virtual TE node, VN, such as virtual TE node VN 1.2.1.1, as illustrated in FIG. 7 with a greater number of access TE links, ALs, and a potentially large detailed connectivity matrix, DCM. Finally, it is also possible to interconnect virtual TE nodes, VNs, representing the same TE domain segment, TE-SEG, with virtual TE links, VLs, to express more complex internal connectivity scenarios. For example, it is possible to break all access TE links, ALs, of a given traffic engineering domain segment, TE-SEG, as shown in FIG. 6, into two sets X,Y (with X=[AL1, AL2, AL5, AL6] and Y=[AL3, AL4, AL7]) with all ALs within each of the ywo set having unlimited connectivity within the set, and no connectivity between the ALs belonging to different sets, except for the required connectivity between, for instance, access TE links AL2 and AL3. In this case, the traffic engineering domain segment, TE-SEG, can be collapsed as a combination of two symmetrical virtual TE nodes (VN 1.2.1.1 and VN 1.2.1.2 with the access TE link AL2 of virtual TE node 1.2.1.1 interconnected with the access TE link AL3 of virtual TE node 1.2.1.2 via a virtual TE link, VL, depicted as a broken line in FIG. 9). Generally speaking, a contiguous TE domain segment, TE-SEG, can be collapsed into a virtual TE topology made of one or more virtual TE nodes, VNs, interconnected via zero or more virtual TE links, VLs, that collectively yield a TE aggregate that is minimal in size.

Figure 10:
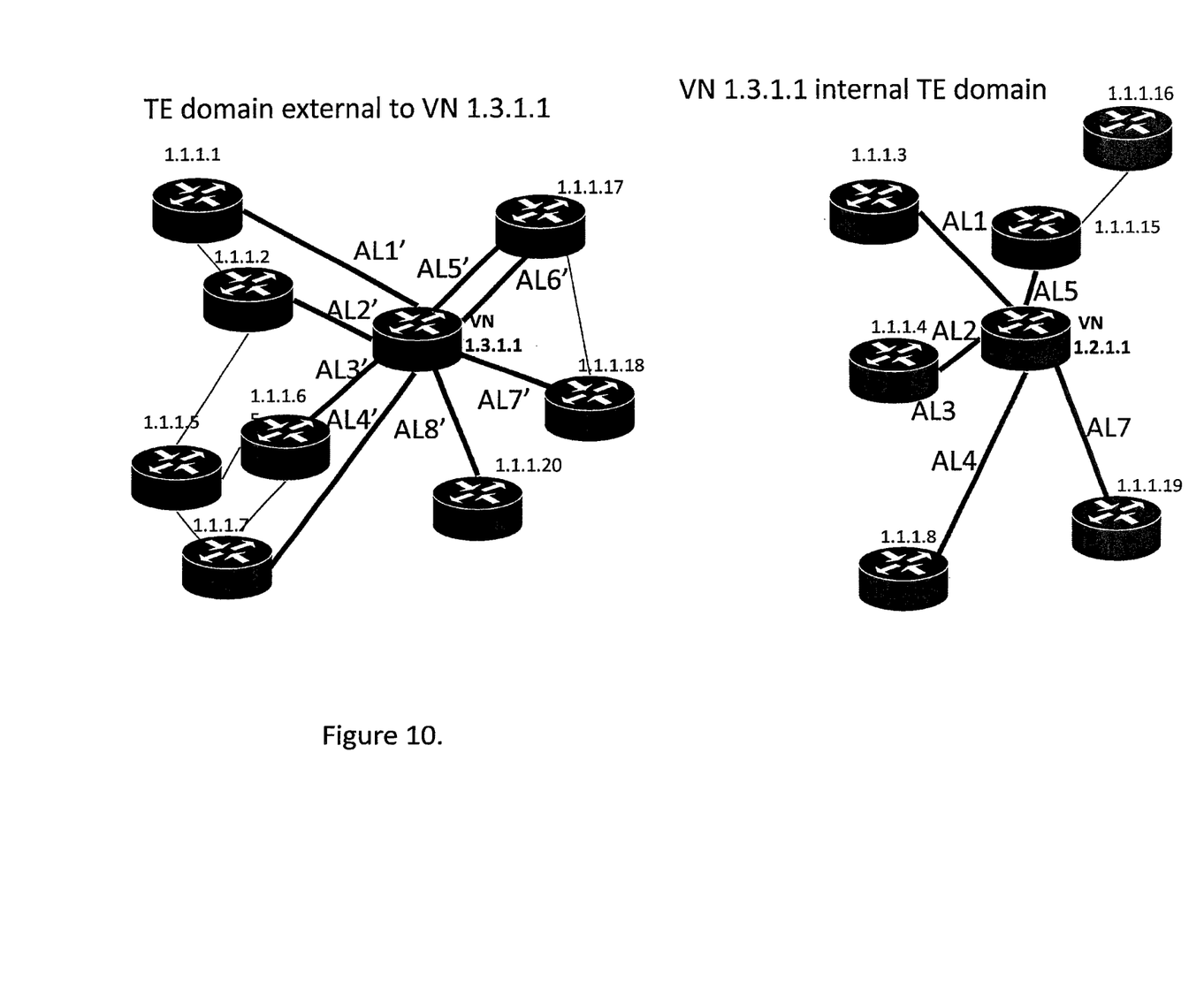
FIG. 10 shows a diagram for illustrating a hierarchical virtual node as provided by a possible embodiment of the method according to the present invention.

In a possible embodiment, the collapsing of the virtual TE nodes can be performed in a hierarchical way, wherein a contiguous TE domain segment, TE-SG, is collapsed into a virtual TE node, VN, and then the TE domain into which the virtual TE node, VN, is advertised (or a part of it) can also be collapsed into another virtual TE node, VN, i.e. advertised as a single node into the same TE domain or a TE domain of a higher hierarchy level, and so forth, as also illustrated in FIG. 10. This guarantees unlimited traffic engineering, TE, scale of a network of any size.

In a possible embodiment computing paths and setting up services on hierarchically virtualized topologies can be performed also in a hierarchical way. The original computation is performed always end-to-end in terms of highest level virtual TE nodes, VNs, on the traffic engineering database, TED, that includes the services source-destination pair(s), and, after that, the paths can be expanded independently and hierarchically within each virtual TE node, VN, they traverse. For example, considering the example shown in FIG. 10, there can be a request to set up a service betweennodes 1.1.1.5 and 1.1.1.18. The path computation performed on the highest level TE topology that includes both the service source and the destination TE nodes can produce a path 1.1.1.5 to 1.1.1.6 to 1.3.1.1 (virtual TE node VN) to 1.1.1.18. When the service set-up message with the computed path reaches the virtual TE node 1.3.1.1, the path will be expanded, i.e. modified by replacing the virtual node, VN, path element with the internal path across the virtual TE node, VN, pre-computed by the internal path computation element, PCE, of the virtual TE node, VN, to interconnect the access TE links AL3' and AL7' of the virtual TE node, VN. For example, such a path is 1.1.1.4 to 1.2.1.1 (virtual TE node) to 1.1.1.19. When the service setup message with the modified path arrives at the virtual TE node VN 1.2.1.1, the path will be expanded again by replacing the virtual TE node, VN, path element with the internal path across the virtual TE node, VN, pre-computed to interconnect the virtual TE node, VN, access TE links AL2 and AL7, as illustrated in FIG. 7. This path can be, for example, from 1.1.1.9 to 1.1.1.11 to 1.1.1.14. By this time, the path is fully expanded and does not contain virtual TE nodes, VNs. Once the path is fully expanded, the service setup can be completed as on a flat TE topology of the network. The described hierarchically path computation and service provisioning as performed by the method and apparatus according to the present invention guarantees a much faster path computation compared to one performed on the flat TE topology describing the same network. This is because internal paths across virtual TE nodes, VNs, are pre-computed. Moreover, this approach works equally well for a single path computation, concurrent diverse multi-path computation for a single service or concurrent multi-path computation for multiple services. This is because the path(s) is/are computed end-to-end, rather than segment by segment and the paths are expanded within virtual TE nodes, VNs, independently from each other.

It is of note that the TE domain a given virtual TE node, VN, is advertised into and the TE domain comprising the internals of said virtual TE node, VN, are totally independent from each other. Therefore, the TE links and nodes that belong to inner and outer TE domains such as illustrated in FIG. 7 on the left and right side, can be named in a possible embodiment from independent address spaces without any concern about assigning the same address to one of the internal to the VN TE nodes or links, and, for example, to the virtual TE node, VN, itself or one of the TE nodes or links that belongs to the outer TE domain. Furthermore, the internal paths across the virtual TE node, VN, and hence the network resources required for the connectivity across the virtual TE node, VN, are entirely under control of the network operator. Therefore, it is possible to separate resources available for the services across the virtual TE node, VN, from resources reserved for an internal network building within the virtual node, VN.

The invention claimed is:

1. A method for scaling Traffic Engineering, TE, routing in a network, comprising a plurality of network elements (nodes) connected in a given layer to each other via links,
    wherein contiguous TE domain segments, TE-SEGs, of a TE domain of said network are collapsed into virtual TE nodes, VN, each having an allocated TE domain unique identifier, VNID, and a detailed connectivity matrix, DCM, to provide a hierarchically virtualized network topology of said network,
    wherein a TE domain segment, TE-SEG, is selected by a network operator as an arbitrary contiguous part of the TE domain, and is collapsed into at least one virtual TE node, VN, representing the selected TE domain segment, TE-SEG,
    wherein the virtual TE node, VN, collapsing is achieved by reconfiguring the TE links, connecting the selected TE domain segment, TE SEG, with the rest of the TE domain, thus forming VN access links, ALs, as well as all of the TE domain segment TE links, thus forming VN internal TE links, ILs, in such a way, that the AL advertisements flooded across the TE domain represent said TE domain segment, TE-SEG, to the remaining part of the TE domain as at least one virtual TE node, while the IL advertisements are contained within the respective VN(s) and are not leaked into said TE domain.

2. The method according to claim 1, wherein the selected TE domain segment, TE-SEG, internal TE links, ILs, connecting the TE nodes within the TE-SEG, represented by at least one virtual TE node, VN, are reconfigured to be advertised into distinct TE domains, each of which associated with respective virtual TE node, VN.

3. The method according to claim 2, wherein a dedicated policy controller, POL-CTRL, of a virtual TE node, VN, is provided to enforce policies of the network operator with respect to a required connectivity between the access TE links, ALs, across the virtual TE node, VN.

4. The method according to claim 3, wherein a dedicated path computation element, PCE, of a virtual TE node, VN, performs internal path computations between access TE links, ALs, of said virtual TE node, VN, to generate the detailed connectivity matrix, DCM, of the virtual TE node, VN, advertised to the TE domain external to said VN.

5. The method according to claim 1, wherein the virtual TE nodes, VNs, representing a selected contiguous TE domain segment, TE-SEG, are interconnected by virtual TE links, VLs.

6. The method according to claim 1, wherein the selected contiguous TE domain segment, TE-SEG, comprises TE nodes, including virtual TE nodes, VNs, connected to each other via TE links, including virtual TE links, VLs.

7. The method according to claim 1, wherein the hierarchically virtualized network topology of the network comprising virtual TE nodes, VNs, of different hierarchy levels is exploited to compute path(s) between a single or multiple sets of service source destination TE node pairs within a given TE domain.

8. An apparatus for scaling Traffic Engineering, TE, routing in a network comprising a plurality of network elements (nodes) connected in a given network layer to each other via links, is adapted to collapse selected by the operator arbitrary contiguous TE domain segments, TE-SEGs, of a TE domain of said network into virtual TE nodes, VNs, each having an allocated TE domain unique identifier, VNID, and a detailed connectivity matrix, DCM, to provide a hierarchically virtualized network topology of said network,
wherein a contiguous TE domain segment, TE-SEG, is selected by a network operator and collapsed into at least one virtual TE node, VN, representing said TE-SEG by reconfiguring access TE links, ALs, connecting the TE-SEG with the remaining part of said TE domain such that the ALs advertise the TE domain unique identifier(s), VNID(s), of the respective virtual TE nodes, VNs, as local node identifiers.

9. The apparatus according to claim 8, wherein the internal TE links connecting TE nodes within the selected contiguous TE domain segment, TE-SEG, represented by at least one virtual TE node, VN, are reconfigured to be advertised into distinct TE domains, each associated with a respective virtual TE node, VN.

10. The apparatus according to claim 9, wherein a dedicated policy controller, POL-CTRL, of a virtual TE node, VN, is provided to enforce policies of the network operator with respect to a required connectivity between the access TE links, ALs, across the virtual TE node, VN.

11. The apparatus according to claim 10, wherein a dedicated path computation element, PCE, of a virtual TE node, VN, performs internal path computations between access TE links, ALs, of said VN to generate the detailed connectivity matrix, DCM, of the VN, advertised in to the TE domain external to the VN.

12. A transport network comprising an apparatus according to claim 8.

13. The transport network according to claim 12, wherein the transport network comprises a wavelength division multiplexing, WDM, layer network, a SDH network,
an Ethernet network, and/or a MPLS-TP network.

* * * * *